(12) United States Patent
Soon

(10) Patent No.: US 6,424,729 B1
(45) Date of Patent: Jul. 23, 2002

(54) OPTICAL FINGERPRINT SECURITY VERIFICATION USING SEPARATE TARGET AND REFERENCE PLANES AND A UNIQUENESS COMPARISON SCHEME

(76) Inventor: Boon Yi Soon, 52 Chambers St., Dayton, OH (US) 45409

( * ) Notice: Subject to any disclaimer, the term of this patent is extended or adjusted under 35 U.S.C. 154(b) by 0 days.

(21) Appl. No.: 09/260,382

(22) Filed: Mar. 2, 1999

(51) Int. Cl.[7] ............................................. G06K 9/00
(52) U.S. Cl. ..................................... 382/124; 382/209
(58) Field of Search ................................. 382/209, 210, 382/211, 276, 278, 124, 125, 126, 127, 115, 116, 156; 359/561, 558, 559; 708/816, 813

(56) References Cited

U.S. PATENT DOCUMENTS

| | | | |
|---|---|---|---|
| 5,224,173 A | * 6/1993 | Kuhns et al. | 382/116 |
| 5,367,579 A | * 11/1994 | Javidi et al. | 382/210 |
| 5,699,449 A | * 12/1997 | Javidi | 382/156 |
| 5,815,598 A | * 9/1998 | Hara et al. | 382/211 |

OTHER PUBLICATIONS

Edge Detection Using Joint Transform Correlation, by Alam et al, SPIE Conference, pp. 343–353, Apr. 1997.*

Improved Feature Extraction by Use of a Joint Wavelet Transform Correlator, by Boon et al, Applied Opics vol. 37, No. 5, pp. 821–827, Feb. 10, 1998.*

Guowen Lu et al.; "Pattern classification using a joint transform correlator based nearest neighbor classifier;" Opt. Eng. 35(8) 2162–2170 (Aug. 1996).

Zikuan Chen et al.; "Complementary–reference joint transform correladtor;" Applied Optics / vol. 33, No. 32 / Nov. 10, 1994.

* cited by examiner

*Primary Examiner*—Joseph Mancuso
*Assistant Examiner*—Vikkram Bali
(74) *Attorney, Agent, or Firm*—Lumen Intellectual Property Services, Inc.

(57) ABSTRACT

A hybrid electro-optics correlator comprises a first spatial light modulator for displaying a number of reference images, and a second spatial light modulator for separately displaying a target image. The target and reference images are optically jointly Fourier transformed to produce a joint power spectrum that is detected by a first detector and stored in a computer. Target-only and reference-only power spectra, corresponding to Fourier transforms of the target and reference images, respectively, are digitally subtracted from the joint power spectrum by the computer. The result is a modified power spectrum. The modified power spectrum is displayed by the first spatial light modulator, and is optically Fourier transformed to produce a cross-correlation pattern that is detected by the first detector. Cross-correlation peaks are identified within the cross-correlation pattern, and maximum cross-correlation peak values are compared with verification values in a uniqueness comparison scheme. If one of the maximum cross-correlation peak values falls within a range of the corresponding verification value, the target image is determined to be authentic.

9 Claims, 4 Drawing Sheets

OPTICAL FINGERPRINT SECURITY VERIFICATION USING SEPARATE TARGET AND REFERENCE PLANES AND A UNIQUENESS COMPARISON SCHEME

FIELD OF THE INVENTION

The present invention generally relates to electro-optical systems for security verification, and in particular to an improved method and system using a joint transform correlator.

BACKGROUND

In a classical joint transform correlator system, a plurality of reference images are known, and a target image is unknown. The system is designed to determine whether the target image is the same as any of the reference images. A comparison is made by correlating the images optically; the correlation result is determined from detected cross-correlation peak values.

The target and reference images are displayed in a joint input scene. The scene is illuminated, resulting in an amplitude of light $f(x,y)$ emanating from the joint input scene. The light is optically Fourier transformed, resulting in a complex amplitude F. The joint power spectrum, corresponding to $|F|^2$, is detected. The joint power spectrum $|F|^2$ (not F) is then Fourier transformed, resulting in a cross-correlation pattern.

In general, if there is one target image and n reference images, the cross-correlation pattern has n+1 zeroth-order terms and n-choose-2 false alarm terms that are undesired. The cross-correlation pattern also has n desired cross-correlation terms. The power spectrum subtraction technique, known in the art, removes the undesired terms. A brief explanation can be found in "Improved Feature Extraction Using A Joint Wavelet Transform Correlator," Boon Yi Soon, M. S. Alam, and M. A. Karim, Applied Optics, 37 (1998) pp. 821–827, and "Edge Detection Using Joint Transform Correlation," Boon Yi Soon, M. S. Alam, and M. A. Karim, Proceedings of SPIE, 3073 (1997) pp. 343–353.

The spatial separation between the target and reference images needs to meet the Nyquist criterion in order for the terms in the cross-correlation pattern to be distinctive spatially from each other. When many reference images are used while still meeting the Nyquist criterion, the space-bandwidth product requirement needed to accommodate all images increases. Basically, the space-bandwidth product is the number of pixels necessary in the display device used for displaying the target and reference images. The most common display device is a spatial light modulator, or SLM. A high quality SLM is the most expensive component in the optical correlator. Therefore, when a large SLM is needed to display the joint input scene, the cost of implementation is very high.

Other techniques are available to perform optical security verification; one interesting proposal is presented in "Pattern Classification Using A Joint Transform Correlator Based Nearest Neighbor Classifier," G. Lu and F. Yu, Optical Engineering 35 (1996) pp. 2162–2170. The primary goal of G. Lu et al. is to determine the correct character from a template of characters used as the reference images. In their correlation output, there is a location allocated for each reference image. They claim that their nearest neighbor classification scheme, which is based on the "maximum-win-all" algorithm, will verify the correct character by identifying the largest cross-correlation peak, which occurs at the location of the corresponding correct reference image in the correlation output.

However, the scheme of G. Lu et al. is inaccurate at times because the largest cross-correlation peak does not always correspond to the correct reference image, as illustrated in "Complementary-Reference Joint Transform Correlator," Z. K. Chen, Y. Zhang, and G. Mu, Applied Optics, 33 (1994) pp. 7622–7626. When a plain white image correlates with a character, for example, the cross-correlation peak is higher than the cross-correlation peak of the character with itself. Moreover, the cases when none of the reference images is the target image, and when two or more reference images are the target image, are not discussed.

Javidi et al., in U.S. Pat. No. 5,367,579, disclose a joint transform correlator of a target and reference image. The desired cross-correlation terms are optically separated from the unwanted terms by focusing the desired and undesired terms on different planes. However, diffuse light from the undesired terms still contaminates the desired signal.

Objects and Advantages

In view of the above, it is an object of the present invention to provide a system and method for fingerprint verification that does not require an expensive spatial light modulator. It is another object to provide an improved method for using cross-correlation peaks to determine whether the target image matches one of the reference images. It is a further object to provide a system and method that isolates cross-correlation peaks from optical contamination.

These objects yield a system and method having the following advantages: a target image such as a fingerprint can be checked for authenticity at reduced cost and with improved accuracy.

Summary

An improved system and method for optical fingerprint security verification is disclosed. The system comprises a hybrid electro-optics correlator comprising first and second spatial light modulators. The first spatial light modulator displays n reference images, where n is any positive number. The second spatial light modulator displays a target image. Because the target and reference images are separated, a large and expensive spatial light modulator is not needed.

The spatial light modulators are illuminated by monochromatic, polarized light. Light emanating from the first spatial light modulator and a portion of the light emanating from the second spatial light modulator are combined, jointly Fourier transformed, and detected by a first detector. The resulting joint power spectrum is stored in a computer.

Another portion of the light emanating from the second spatial light modulator is Fourier transformed and detected by a second detector. The resulting target-only power spectrum is also stored in the computer. The target-only and joint power spectra are detected simultaneously. A reference-only power spectrum corresponding to a Fourier transform of the reference images is stored in the computer as well.

The computer runs a program that preferably high-pass filters the target-only, reference-only, and joint power spectra. The program then obtains a modified power spectrum by subtracting the target-only and reference-only power spectra from the joint power spectrum. Because the high-pass filtering and subtraction are performed digitally rather than optically, a clean signal is produced.

The computer then displays an image corresponding to the modified power spectrum on the first spatial light modulator, and the first detector receives a cross-correlation pattern corresponding to a Fourier transform of the modified power spectrum. Cross-correlation peaks are identified, and maximum cross-correlation peak values $A_i$ are determined, for i=1 to n.

The values $A_i$ are subsequently processed using the following "uniqueness comparison scheme." Each value $A_i$ is compared to a corresponding verification value $A_i'$. A tolerance, or range $\Delta$ is fixed by the user, and each value $A_i$ is tested to determine whether $A_i' - \Delta \leq A_i \leq A_i' + \Delta$ for one value of i. If $A_i$ falls within the range $\Delta$ of $A_i'$ for exactly one value of i, the target image is authenticated as being equivalent to the $i^{th}$ reference image. Otherwise, the target image is rejected. The uniqueness comparison scheme overcomes difficulties of the prior art, which rely only on the largest cross-correlation peak.

The system also includes a means for capturing the target image. A total-internally-reflecting prism, upon which a finger may be placed, is illuminated by monochromatic light. Light reflected from the interface between the prism and the finger carries an image of a fingerprint; the reflected light is detected by a third detector stored by the computer.

DETAILED DESCRIPTION

Figure 1:
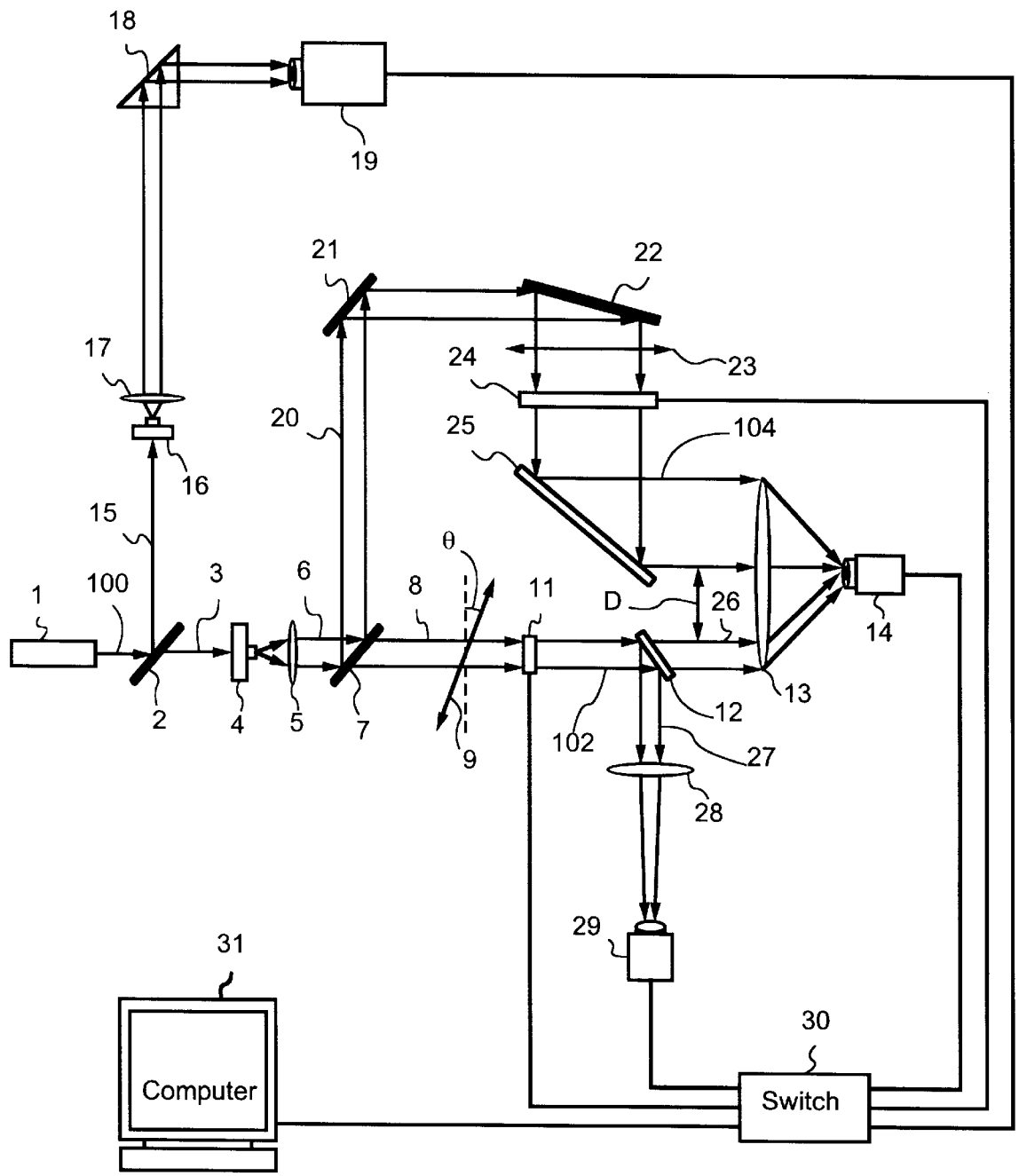
FIG. 1 illustrates a hybrid electro-optics correlator according to the present invention.

FIG. 1 illustrates a hybrid electro-optics correlator, or joint transform correlator, for security verification. A laser 1 emits a beam 100 that is incident upon a beam splitter 2. Beam splitter 2 splits beam 100 into a probe beam 15 and an identification beam 3. Beam splitter 2 has a 1:1 ratio of transmission:reflection, so beams 3 and 15 have equal intensities.

Probe beam 15 is spatially filtered by a spatial filter assembly 16, and is collimated by a lens 17. Probe beam 15 then enters a 45-45-90 prism 18. An unknown user places a finger on prism 18. Where oil on the user's skin contacts the prism, beam 15 is transmitted to an attenuated by the finger. Where no oil is present, beam 15 is totally internally reflected by prism 18. Beam 15 therefore emerges from prism 18 carrying an image of the user's fingerprint. Beam 15 is then detected by a charge coupled device, or CCD 19. The captured image of the user's fingerprint is stored in a computer 31 for later use.

Identification beam 3 is spatially filtered by a spatial filter assembly 4 and collimated by a lens 5. Identification beam 3 then passes through a beam splitter 7 having a transmission:reflection ratio of 2:1. Beam 3 is split by beam splitter 7 into a reflected beam 20 and a transmitted beam 8, where transmitted beam 8 has twice the intensity of reflected beam 20.

A polarizer 9 polarizes transmitted beam 8 at an angle θ with respect to the plane of the page of FIG. 1. Angle θ is equal to 60°. Transmitted beam 8 then illuminates a target spatial light modulator, or target SLM 11. Target SLM 11 modulates transmitted beam 8 to form a target beam 102. A polarized beam splitter 12 splits target beam 102 into a beam 26 and a beam 27. Beams 26 and 27 have equal intensities. Beam 26 is polarized in the plane of the page of FIG. 1; beam 27 is polarized perpendicular to the plane of the page of FIG. 1.

Meanwhile, reflected beam 20 strikes a first mirror 21 and a second mirror 22. Reflected beam 20 then encounters a polarizer 23 that polarizes reflected beam 20 in the plane of the page of FIG. 1. Reflected beam 20 then illuminates a reference SLM 24. Reflected beam 20 is modulated by reference SLM 24; the result is a reference beam 104. Reference beam 104 strikes, and is 100% reflected by, a polarized beam splitter 25.

Figure 3:
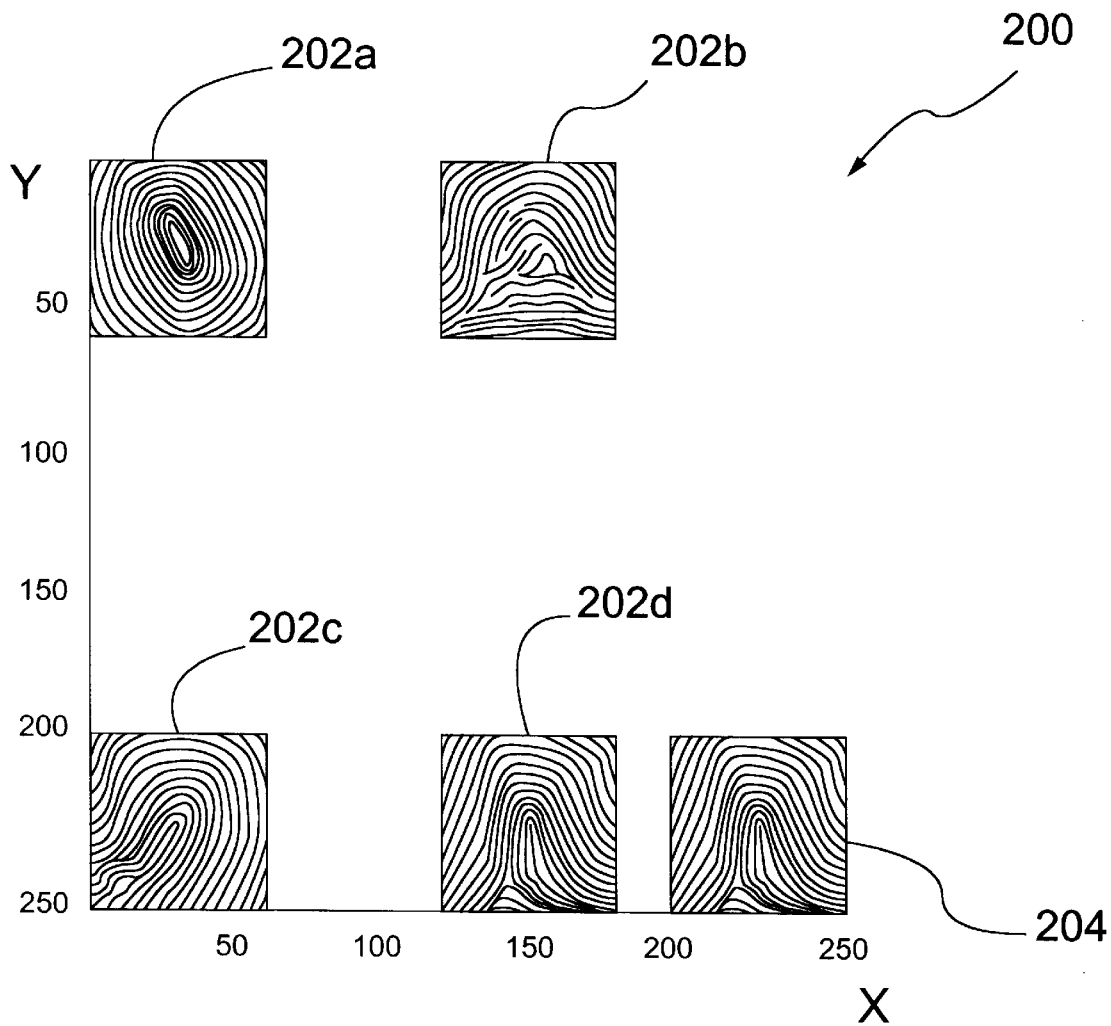
FIG. 3 is an example of a joint input scheme.

Target SLM 11 displays a target image 204, as illustrated in FIG. 3. Target image 204 is the image of the user's fingerprint detected by CCD 19 and stored in computer 31. Reference SLM 24 displays a plurality of reference images. In the illustration of FIG. 3, four reference images 202a–d are shown. In general, n reference images are displayed, where n is any positive number. Reference images 202a–d comprise fingerprints of authorized agents. The purpose of the electro-optics correlator of FIG. 1 is to determine whether the user whose fingerprint is displayed as target image 204 is one of the authorized agents.

Reference SLM 24 is larger than target SLM 11, since reference SLM 24 displays a plurality of images, and target SLM 11 displays only one image. Reference SLM 24 must be large enough to accommodate all of the reference images with adequate spacing to meet the Nyquist criterion. For example, if the reference images are each N×N pixels in size, the spacing between the reference images should be at least N pixels on all sides of each of the reference images.

Beam 26, which comprises a portion of target beam 102, passes through a lens 13. Reference beam 104 also passes through lens 13. Polarized beam splitters 26 and 12 guide beams 26 and 104 so that, just before beams 26 and 104 enter lens 13, the beams are parallel and are a distance D apart. Accordingly, reference images 202a–d and target image 204 are combined into a joint input scene 200, as shown in FIG. 3, by polarized beam splitters 26 and 12.

Distance D is related to the diameter of lens 13: distance D is the largest distance possible such that beams 26 and 104 both pass through lens 13. Distance D thereby optimizes the space-bandwidth for the detection of beams 26 and 104. After passing through lens 13, beams 26 and 104 are detected by a CCD detector 14.

Detector 14 is located a focal distance away from lens 13. That is, lens 13 has a focal length $f_1$, and the distance between lens 13 and detector 14 is $f_1$. Furthermore, the optical path length between reference SLM 24 and lens 13 is $f_1$, and the optical path length between target SLM 11 and lens 13 is $f_1$.

Lens 13 performs an optical Fourier transform on the joint input scene comprising the reference images and the target image displayed on the SLMs. Lens 13 may be replaced by any optical element or apparatus that performs a Fourier transform. Detector 14 is a pixelated detector sensitive to light intensity. Detector 14 detects a joint power spectrum corresponding to the Fourier transform of joint input scene 200. The joint power spectrum is then stored electronically by computer 31.

Beam 27 enters lens 28, is thereby Fourier transformed, and enters a CCD detector 29. Detector 29 captures a target-only power spectrum corresponding to the Fourier transform of the target image displayed on target SLM 11. The target-only power spectrum is then stored electronically by computer 31.

Lens 28 has a focal length $f_2$, and the distance between lens 28 and detector 29 is $f_2$. The optical path length between target SLM 11 and lens 28 is also $f_2$.

Beams 26, 27, and 104 all have the same intensity. In the present embodiment, the joint power spectrum and the target-only power spectrum are captured simultaneously.

A reference-only power spectrum is also stored in the memory of computer 31. The reference-only power spectrum corresponds to the Fourier transform of the reference images alone. The reference-only power spectrum is obtained by displaying reference images 202a–d on reference SLM 24, and blocking target beam 102. Reference beam 104 is then Fourier transformed by lens 13 and detected by detector 14. The light intensities so detected compose the reference-only power spectrum.

When a new target image is presented to the electro-optics correlator, new target-only and joint power spectra are collected. However, the reference-only power spectrum is the same for each new target image. Therefore, the reference-only power spectrum is captured only once, stored in the memory of computer 31, and used many times.

Joint input scene 200 is represented mathematically by a function f(x,y), where x and y are coordinates in the plane of the joint input scene, and f is proportional to the amplitude of light emerging from point (x,y). Target image 204 centered at $(x_0,y_0)$ is represented by $t(x-x_0,y-y_0)$. The $i^{th}$ reference image is represented by $r_i(x-x_i,y-y_i)$. The index i ranges from 1 to n, where n is the number of reference images. The $i^{th}$ reference image is centered at coordinates $(x_i,y_i)$. The coordinates (x,y) define a fictional plane comprising both SLM 11 and SLM 24.

The amplitude of light emanating from the joint input scene is $$f(x,y) = t(x-x_0, y-y_0) + \sum_{i=1}^{n} r_i(x-x_i, y-y_i) \quad (1)$$

The light emanating from the joint input scene comprises beam 26 and reference beam 104 in FIG. 1. The beams are jointly Fourier transformed by lens 13. The resulting complex amplitude is F(u,v), where u and v are coordinates in a detection plane of detector 14 and F(u,v) is the Fourier transform of f(x,y). The detection plane is situated a distance $f_1$, from lens 13 and is perpendicular to the optic axis of lens 13. F(u,v) is sometimes referred to as a joint Fourier transform of the target and reference images.

The joint power spectrum captured by detector 13 is equal to $|F(u,v)|^2$. The Fourier transform of t(x,y) is T(u,v). The Fourier transform of t(x,y) may be expressed in complex coordinates as $|T(u,v)| \exp(i\phi_t)$. Similarly, the Fourier transform of $r_i(x,y)$ is $R_i(u,v)$, and $R_i(u,v)=|R_i(u,v)| \exp(i\phi_{ri})$.

Using Eq. (1), and taking into account the positions $(x_0,y_0)$ and $(x_i,y_i)$ of the target and reference images, respectively, the properties of the Fourier transform lead to the result that the joint power spectrum is:

$$|F(u,v)|^2 = |T(u,v)|^2 + \sum_{i=1}^{n} |R_i(u,v)|^2 + \quad (2)$$

$$2\sum_{i=1}^{n} \sum_{k \neq i} |R_i(u,v)||R_j(u,v)|$$

$$\cos[\phi_{ri} - \phi_{rk} - 2\pi\{u(x_i - x_k) + v(y_i - y_k)\}] +$$

$$2\sum_{i=1}^{n} |R_i(u,v)||T(u,v)|$$

$$\cos[\phi_t - \phi_{ri} - 2\pi\{u(x_0 - x_i) + v(y_0 - y_i)\}]$$

The first term on the right-hand side of Eq.(2) is the target-only power spectrum detected detector 29. The second and third terms are the reference-only power spectrum discussed above. Only the fourth term gives desired cross-correlations between the target image and the reference images.

In the present method and apparatus, the target-only power spectrum and the reference-only power spectrum are subtracted from the joint power spectrum. The result of the subtraction is a modified power spectrum $|M(u,v)|^2$ given by $$|M(u,v)|^2 = \quad (3)$$

$$2\sum_{i=1}^{n} |R_i(u,v)||T(u,v)|\cos[\phi_t - \phi_{ri} - 2\pi\{u(x_0-x_i) + v(y_0+y_i)\}]$$

This subtraction is carried out by computer 31.

In an optional but preferred step, the joint, target-only, and reference-only power spectra are each digitally high-pass filtered by computer 31. The modified power spectrum is then the result of subtracting the filtered target-only and reference-only spectra from the filtered joint power spectrum.

The modified power spectrum is subsequently displayed on reference SLM 24. The reference SLM is illuminated by beam 20. Lens 13 optically Fourier transforms the modified power spectrum to form a cross-correlation pattern that is detected by detector 14. A switching circuit 30 is included in the electro-optics correlator to coordinate the sequence of operations of CCD 19, reference SLM 24, target SLM 11, detector 14, detector 29, and computer 31.

There are n reference images, and there are 2n cross-correlation peaks in the cross-correlation because the cosine term in Eq. (3) gives identical pairs of cross-correlation peaks. The $i^{th}$ pair of cross-correlation peaks is due to the interference between the target image and the $i^{th}$ reference image, as is apparent from Eq. (3). Only one cross-correlation peak from each pair is necessary for analysis.

Figure 4:
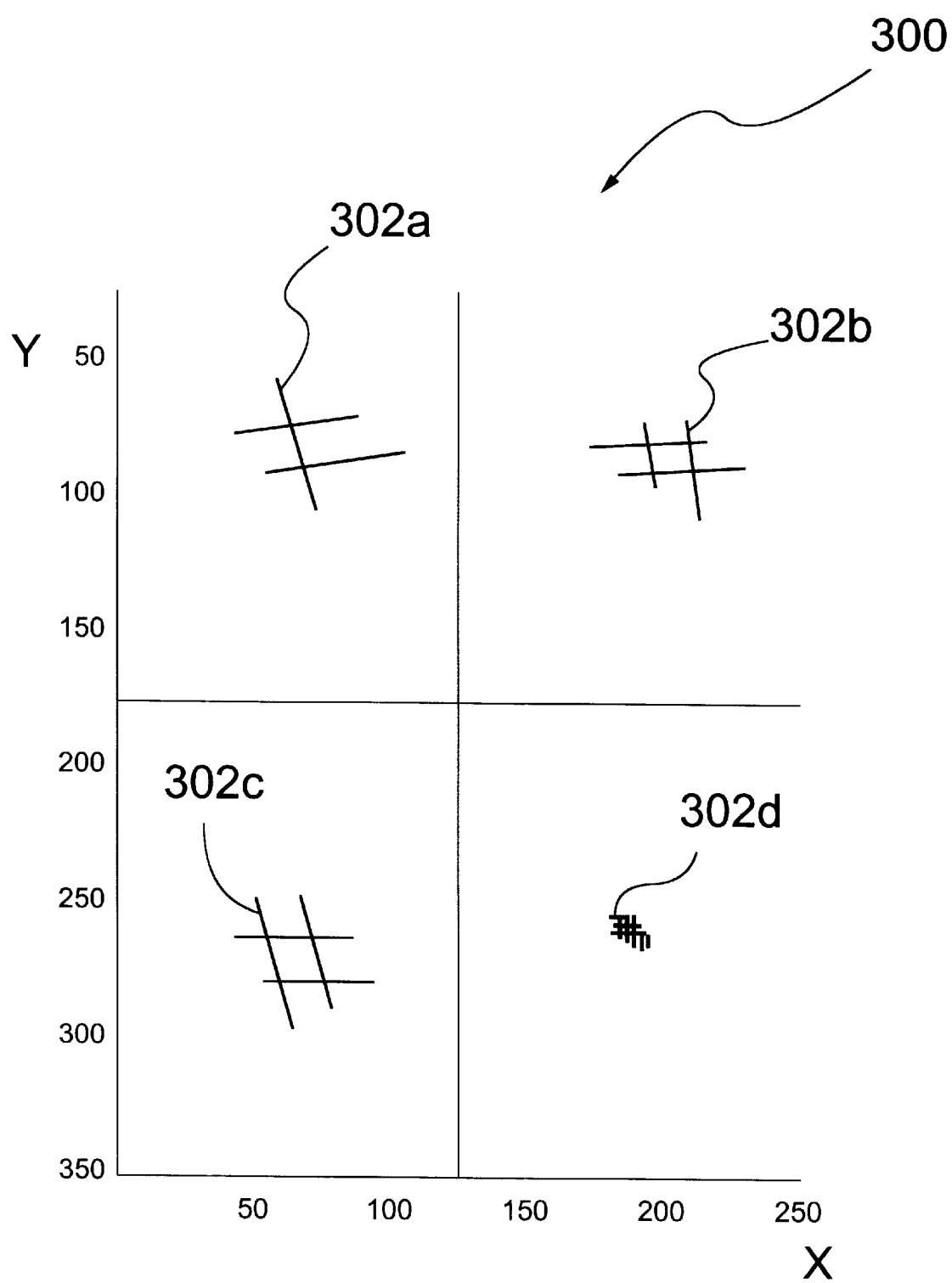
FIG. 4 is a portion of a cross-correlation pattern obtained from the joint input scene.

FIG. 4 shows a truncated cross-correlation pattern 300 having four cross correlation peaks 302a–d. FIG. 4 does not show the pairs of cross-correlation peaks, but only one peak from each pair.

The argument of the cosine term of Eq. (3) determines the locations of the cross-correlation peaks. The two cross-correlation peaks of the $i^{th}$ pair occur at locations $\pm(x_0-x_i, y_0-y_i)$ on the detection plane. These locations are slightly shifted by the linear terms in the phases $\phi_{ri}$ and $\phi_t$, as will be appreciated by one skilled in the art.

Therefore, the locations of the cross-correlation peaks can be determined, and the maximum intensities of each cross-correlation peak, or maximum cross-correlation peak values $A_i$, can be measured. Maximum cross-correlation peak value $A_i$ is the maximum intensity of one of the cross-correlation peaks belonging to the $i^{th}$ pair of cross-correlation peaks. In the illustration of FIG. 4, for each of the cross-correlation peaks 302a,b,c, and d, the maximum cross-correlation peak values $A_1$, $A_2$, $A_3$, and $A_4$, respectively, are measured.

When the user of the electro-optics correlator is the $i^{th}$ authorized agent, so that the target image is identical to the $i^{th}$ reference image, the $i^{th}$ maximum cross-correlation peak value $A_i$ is equal to a true, or verification value $A_i'$. Verification values $A_i'$, for i=1 to n, are stored by computer 31, corresponding to the n authorized users. Verification value $A_i'$ is the maximum peak value of an auto-correlation of the $i^{th}$ reference image with itself.

To determine whether the unknown user is an authorized agent, each of the maximum cross-correlation peak values $A_i$ is compared with the corresponding verification value $A_i'$. If $A_i$ is within a specified range $\Delta$ of $A_i'$, the user is authenticated as being the $i^{th}$ authorized agent. If $A_i$ does not fall within the range Δ of $A_i'$ for any i, the unknown user is rejected as not being an authorized agent.

Figure 2:
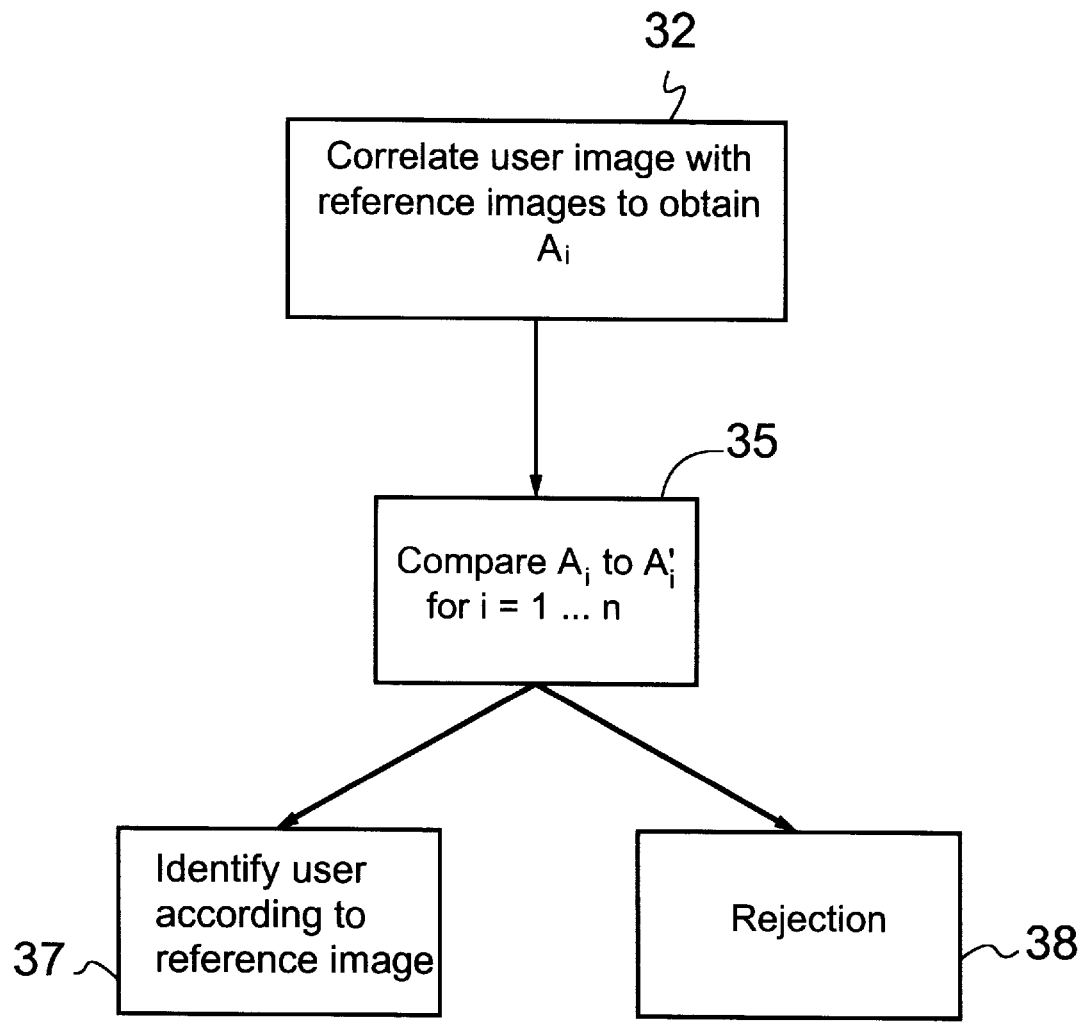
FIG. 2 is a flowchart of a uniqueness comparison scheme.

The above method for authenticating the user is called a uniqueness comparison scheme, and is illustrated in FIG. 2. In a first step 32, the maximum cross-correlation peak values $A_i$ are determined. In a second step 35, maximum cross-correlation peak value $A_i$ is compared with verification value $A_i'$ for i=1 to n. If $$A_i' - \Delta \leq A_i \leq A_i' + \Delta \quad (4)$$

for one value of i, then the user is accepted as an authorized agent in a step 37. If Eq. (4) is not satisfied for any value of i, or is satisfied for more than one value of i, the user is rejected in a step 38. The steps illustrated in FIG. 2 are carried out on computer 31 by a computer program.

The value of the range Δ is adjusted to suit the needs of the users. The value of Δ depends upon the noise inherent in the system, as well as the amount of rotation allowed in the target image.

The uniqueness comparison scheme works particularly well if the optional step of high-pass filtering the power spectra is used, since in this cases the cross-correlation peaks can be approximated by delta-functions (i.e. very narrow peaks).

The above system and method can be modified if the number n of reference images is so large that reference SLM 24 cannot display all of the reference images at one time. In this case, the above procedure is carried out with m reference images, where m<n and reference SLM 24 is capable of displaying m reference images. The procedure is repeated until the target image has been checked against all of the reference images.

Many variations of the above embodiment are possible and remain within the scope of the invention. For example, the reference images need not comprise fingerprints, but may be images of enemy missiles or any other desired images. Furthermore, image display means other than spatial light modulators 11 and 24 may be used to display the target and reference images. Therefore, the scope of the invention should be determined by the following claims and their legal equivalents.

I claim:

1. A method for assessing the authenticity of a target image, said method comprising the steps of:
    a) detecting and electronically storing a joint power spectrum of optical signals corresponding to a Fourier transform of a joint input scene, said joint input scene comprising said target image and a plurality of reference images;
    b) detecting and electronically storing a target-only power spectrum of optical signals corresponding to a Fourier transform of said target image;
    c) electronically storing a reference-only power spectrum of optical signals corresponding to a Fourier transform of said plurality of reference images;
    d) using a computer to subtract said reference-only power spectrum and said target-only power spectrum from said joint power spectrum to form a modified power spectrum;
    e) detecting and electronically storing a cross-correlation pattern of optical signals corresponding to a Fourier transform of a displayed image of said modified power spectrum;
    f) determining maximum cross-correlation peak values of cross-correlation peaks occurring in said cross-correlation pattern-corresponding to said modified power spectrum; and
    g) comparing each of said maximum cross-correlation peak values to a corresponding verification value which is the maximum peak value of an auto-correlation of corresponding reference image with itself;
        wherein if one of said maximum cross-correlation peak values falls within a specified range of said corresponding verification value, said target image is authenticated.

2. The method of claim 1, wherein said step of detecting and electronically storing said joint power spectrum comprises the steps of:
    a) displaying said target image and said plurality of reference images on an image display means;
    b) illuminating said image display means with monochromatic light, wherein said target image and said reference images modulate said monochromatic light to produce a target beam and a reference beam, respectively;
    c) passing said reference beam and a portion of said target beam through an optical Fourier transform element; and
    d) detecting said reference beam and said portion of said target beam.

3. The method of claim 2 wherein said image display means comprises: a first spatial light modulator for displaying said plurality of reference images, and a second spatial light modulator for displaying said target image.

4. The method of claim 1, additionally comprising the step of high-pass filtering the joint power spectrum, the target-only power spectrum, and the reference-only power spectrum.

5. The method of claim 1, wherein said step of detecting and electronically storing said joint power spectrum is performed simultaneously with said step of detecting and electronically storing said target-only power spectrum.

6. A hybrid electro-optics correlator for performing security verification of a target image, said correlator comprising:
    a) a first spatial light modulator for displaying a number of reference images, wherein said number is at least one;
    b) a second spatial light modulator for displaying said target image;
    c) a means for optically performing a joint Fourier transform of said reference and target images, and a means for optically performing a Fourier transform of said target image;
    d) a first detector for detecting a joint power spectrum of said joint Fourier transform, and a second detector for detecting a target-only power spectrum of said Fourier transform of said target image;
    e) a computer in electrical communication with said detectors and with said spatial light modulators, for storing said joint power spectrum and said target-only power spectrum, and for storing a reference-only power spectrum corresponding to a Fourier transform of said reference images; wherein said computer runs a program that:
        i) high-pass filters said target-only, reference-only, and joint power spectra, to create a filtered target-only power spectrum, a filtered reference-only power spectrum, and a filtered joint power spectrum, respectively;
        ii) subtracts said filtered target-only power spectrum and said filtered reference-only power spectrum from said filtered joint power spectrum to create a modified power spectrum;

iii) displays said modified power spectrum on said first spatial light modulator, thereby causing said first detector to detect a cross-correlation pattern corresponding to a Fourier transform of said modified power spectrum;

iv) determines maximum cross-correlation peak values $A_i$ of cross-correlation peaks occurring in said cross-correlation pattern corresponding to said modified power spectrum; and v) verifies said target image as authentic if exactly one of said values $A_i$ lies within a specified range of a corresponding verification value $A_i'$ which is the maximum peak value of an auto-correlation of corresponding reference image with itself.

7. The correlator of claim 6, wherein said first detector detects said joint power spectrum at the same time that said second detector detects said target-only power spectrum.

8. The correlator of claim 6, wherein said target image is an image of a fingerprint, and wherein said correlator further comprises a means, in electrical communication with said computer, for detecting said image of said fingerprint.

9. A method for security verification of a target image, said method comprising the steps of:

a) detecting and electronically storing a cross-correlation pattern corresponding to a modified power spectrum of said target image and a number of reference images;

b) using a computer to determine maximum cross-correlation peak values of cross-correlation peaks occurring in said cross-correlation pattern corresponding to said modified power spectrum; and c) using said computer to compare each of said maximum cross-correlation peak values to a corresponding verification value which is the maximum peak value of an auto-correlation of corresponding reference image with itself;

wherein if one of said maximum cross-correlation peak values falls within a range of said corresponding verification value, said target image is verified.

* * * * *